US 9,909,527 B2

(12) United States Patent
Roelofs et al.

(10) Patent No.: US 9,909,527 B2
(45) Date of Patent: Mar. 6, 2018

(54) HYBRID INDUCTION WELDING PROCESS APPLIED TO PISTON MANUFACTURING

(71) Applicant: Federal-Mogul Corporation, Southfield, MI (US)

(72) Inventors: Zachary Odel Roelofs, Granger, IN (US); Airton Martins, Granger, IN (US); Ross Evers, Tecumseh, MI (US); Oscar Garza, Puebla (MX)

(73) Assignee: Federal-Mogul LLC, Southfield, MI (US)

( * ) Notice: Subject to any disclaimer, the term of this patent is extended or adjusted under 35 U.S.C. 154(b) by 479 days.

(21) Appl. No.: 14/470,200

(22) Filed: Aug. 27, 2014

(65) Prior Publication Data
US 2016/0061142 A1    Mar. 3, 2016

(51) Int. Cl.
*F02F 3/00*  (2006.01)
*B23K 13/01*  (2006.01)
(Continued)

(52) U.S. Cl.
CPC ............... *F02F 3/003* (2013.01); *B21J 5/08* (2013.01); *B21K 3/00* (2013.01); *B23K 13/015* (2013.01); *B23K 20/129* (2013.01); *B23K 20/24* (2013.01); *B23K 28/02* (2013.01); *B23K 31/12* (2013.01); *B23K 2201/003* (2013.01); *B23P 15/10* (2013.01); *F02F 2003/0061* (2013.01)

(58) Field of Classification Search
CPC ........................... F02F 3/003; Y10T 29/49249
USPC ........................................................ 29/888.04
See application file for complete search history.

(56) References Cited

U.S. PATENT DOCUMENTS 6,637,642 B1 * 10/2003 Lingnau ............... B23K 13/00
                                                        219/601
6,825,450 B2 * 11/2004 Ribeiro ................... F02F 3/003
                                                        219/617
(Continued)

FOREIGN PATENT DOCUMENTS

DE    102010033879 A1    2/2012
JP      2004066312 A     3/2004
WO       0025973 A1      5/2000

OTHER PUBLICATIONS

International Search Report, dated Apr. 26, 2016 (PCT/US2015/043767).

*Primary Examiner* — Thomas E Lazo
(74) *Attorney, Agent, or Firm* — Robert L. Stearns; Dickinson Wright, PLLC

(57) ABSTRACT

A hybrid induction welded piston including an upper piston part welded to a lower piston part is provided. The piston is produced by induction heating the upper piston part and the lower piston part, and bringing the parts together to a part growth compensated position. The method then includes rotating the upper piston part 17 to 34 degrees clockwise and then 17 to 34 degrees counterclockwise. In addition to controlling the axial position and degree of rotation, the force applied to the piston parts is controlled so that preferably no flash is formed in a narrow cooling chamber of the piston. During the rotating steps, the pressure gradually increases to a maximum level which occurs while the upper piston part is rotating in the second direction. The piston includes a homogenous metallurgical bond across the weld and no indentation on the outer surface at the weld prior to machining.

36 Claims, 4 Drawing Sheets

(51) Int. Cl.
*B23K 20/12* (2006.01)
*B23K 20/24* (2006.01)
*B23K 28/02* (2014.01)
*B21J 5/08* (2006.01)
*B21K 3/00* (2006.01)
*B23K 31/12* (2006.01)
*B23P 15/10* (2006.01)
*B23K 101/00* (2006.01)

(56) References Cited

U.S. PATENT DOCUMENTS

| | | |
|---|---|---|
| 7,005,620 B2 | 2/2006 | Ribeiro |
| 7,348,523 B2 | 3/2008 | Slack |
| 8,161,935 B2 | 4/2012 | Bing |
| 2004/0177503 A1 | 9/2004 | Bing |
| 2004/0177505 A1 | 9/2004 | Bing |
| 2004/0262297 A1 | 12/2004 | Ribeiro |
| 2006/0207424 A1 | 9/2006 | Gaiser |
| 2012/0037115 A1* | 2/2012 | Schnaiter ............... B23K 11/04 123/193.6 |
| 2014/0191016 A1* | 7/2014 | Lehr .................... B23K 20/129 228/104 |

* cited by examiner

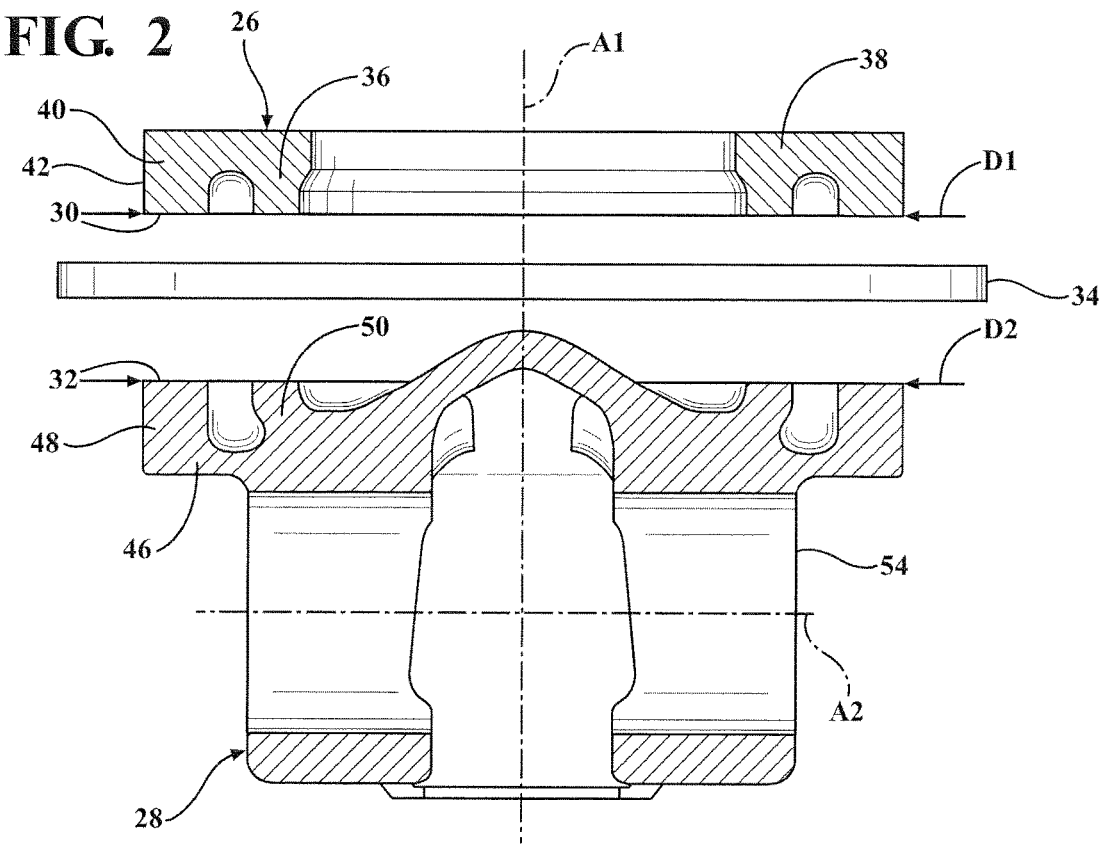
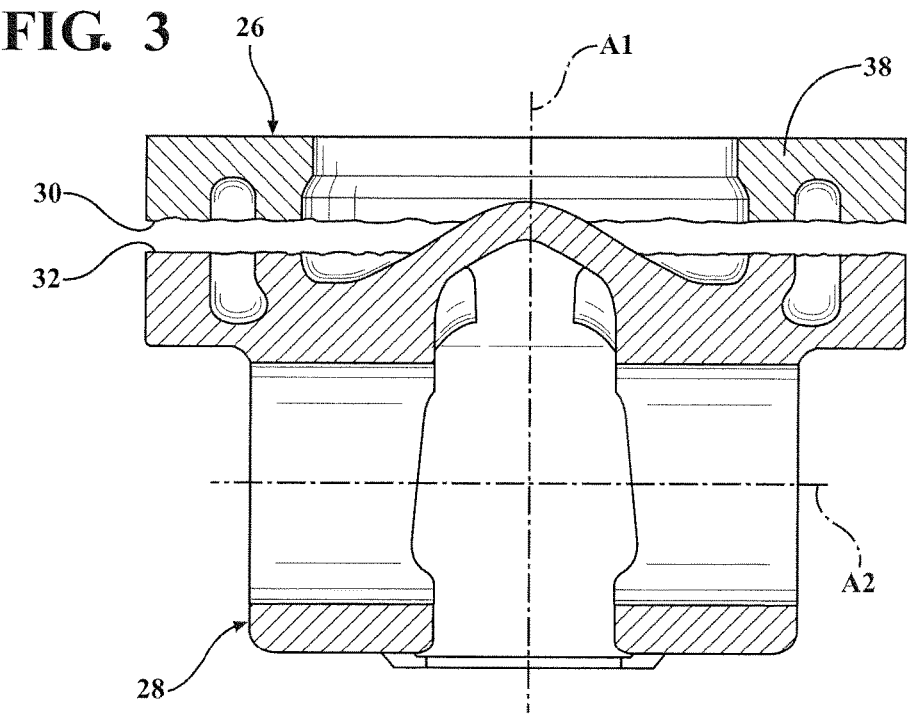

HYBRID INDUCTION WELDING PROCESS APPLIED TO PISTON MANUFACTURING

BACKGROUND OF THE INVENTION

1. Field of the Invention

This invention relates generally to pistons, including light vehicle diesel pistons for internal combustion engines, and methods for manufacturing the same.

2. Related Art

Pistons used in internal combustion engines typically include an upper piston part joined to a lower piston part. Various methods are known for joining the piston parts together. One common joining technique is friction welding, which includes continuously rotating at least one of the piston parts about its center axis at a high speed and under pressure against the other piston part. However, friction welding is known to create a significant amount of flash or scrap material in the cooling chamber of the piston, as well as residual stress and/or cracking along the weld. Resistance welding and laser welding have also been used to join piston parts together. However, these joining methods are known to cause residual stress, inadequate strength, and/or cracking along the weld. Another joining technique includes induction welding the piston parts together. An example of this technique is disclosed in U.S. Pat. Nos. 6,825,450, and 7,005,620. However, there is still a need for strong welded pistons produced with less flash and scrap material, as well as less residual stress and cracking along the weld.

SUMMARY OF THE INVENTION

One aspect of the invention provides a method of manufacturing a piston by hybrid induction welding to produce a strong weld with little to no flash or scrap material along the weld, as well as a homogenous metallurgical bond across the weld. The method comprises heating an upper joining surface of an upper piston part and a lower joining surface of a lower piston part by induction, bringing the heated joining surfaces toward one another, and allowing the heated joining surfaces to contact one another. The method next includes rotating a least one of the piston parts while the heated joining surfaces contact one another. Typically, the rotating step includes rotating one of the piston parts not more than 360 degrees in a first direction while the heated joining surfaces contact one another, and rotating the one piston part not more than 360 degrees in a second direction opposite the first direction while the heated joining surfaces contact one another. The method also includes applying pressure to at least one of the piston parts during the rotating steps to form a weld between the upper piston part and the lower piston part. The step of applying the pressure preferably includes increasing the pressure to a maximum pressure level, and applying the maximum pressure level while rotating the one piston part in the second direction. Instead of, or in addition to, controlling the pressure, the method can include bringing the heated joining surfaces toward one another to a part growth compensated position before the volume of at least one piston part reaches a final volume, wherein the part growth compensated position provides a space between the joining surfaces which compensates for the increase in volume.

Another aspect of the invention provides the hybrid induction welded piston. The piston comprises the upper piston part including the upper joining surface, and the lower piston part including the lower joining surface welded to the upper joining surface. A portion of the upper piston part and a portion of the lower piston part located along the weld together present an outer surface, and the outer surface of the portions located along the weld are free of an indentation prior to machining.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 illustrates a first step of a method of manufacturing the piston according to an exemplary embodiment, which includes induction heating joining surfaces of an upper piston part and a lower piston part;

FIG. 3 illustrates another step of the method of manufacturing the piston according to the exemplary embodiment, when the upper piston part and the lower piston part first arrive at a part growth compensated position;

DESCRIPTION OF THE ENABLING EMBODIMENT

Figure 1:
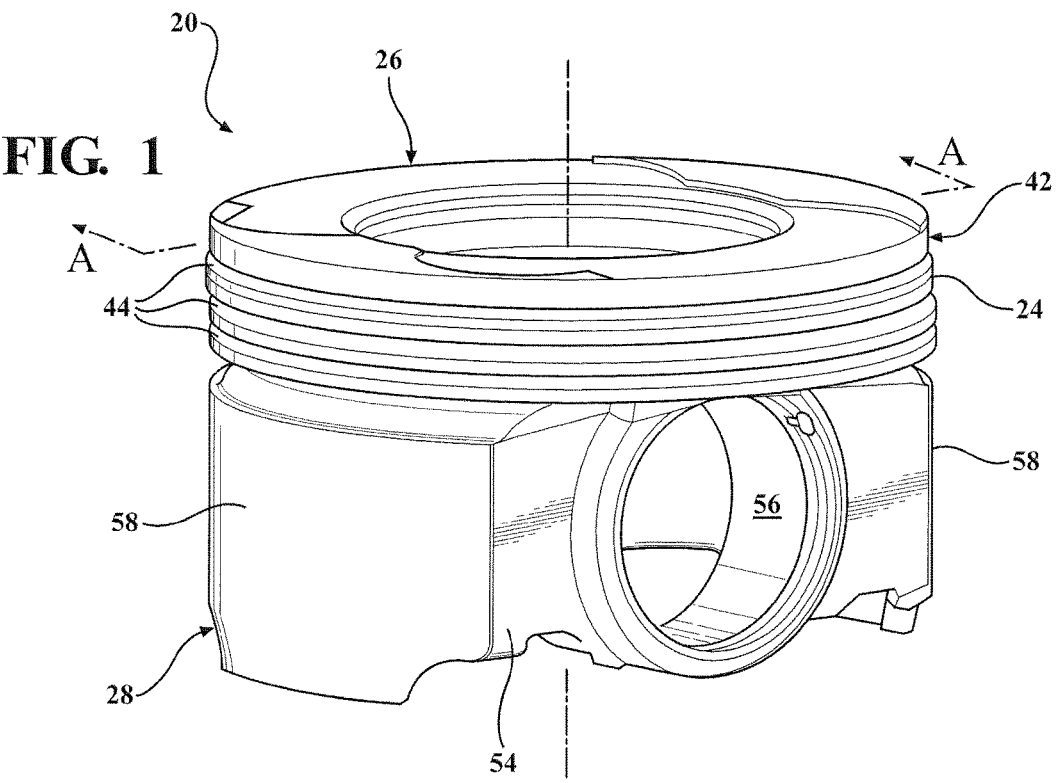
FIG. 1 is a perspective view of a hybrid induction welded piston according to an exemplary embodiment which includes a flat surface along the weld.
Figure 1A:
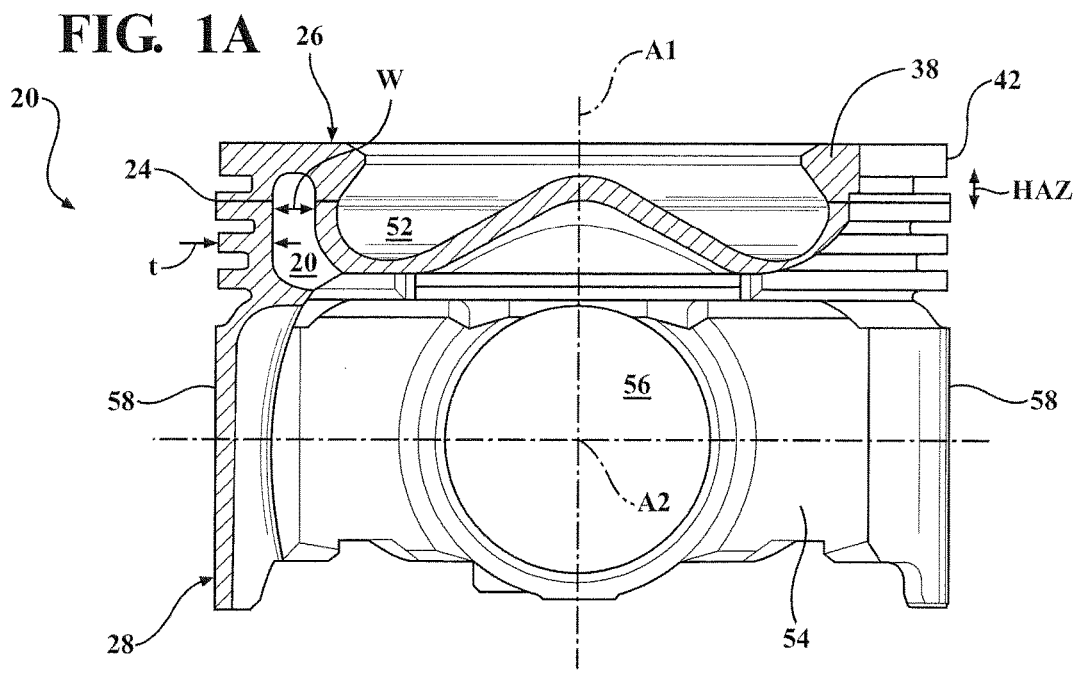
FIG. 1A is a cross-section view of the piston of FIG. 1 along line A-A.

One aspect of the invention provides a method of manufacturing a piston 20 for an internal combustion engine, such as a small diameter steel piston 20 with a narrow cooling chamber 22, as shown in FIGS. 1 and 1A, for use in a light vehicle diesel (LVD) system. The method is referred to as a hybrid induction welding method and includes a unique combination of position and force control. The method produces a strong weld 24 between an upper piston part 26 and a lower piston part 28, as well as a homogenous metallurgical bond across the weld 24.

The method begins by providing the upper piston part 26 and the lower piston part 28 which are used to form the piston 20. The piston parts 26, 28 are typically formed of steel, but can be formed of another type of metal or metal alloy. An upper joining surface 30 of the upper piston part 26 is axially aligned with and spaced from a lower joining surface 32 of the lower piston part 28, as shown in FIG. 2. The method then includes heating the upper joining surface 30 and the lower joining surface 32 by induction in an inert, non-oxidizing atmosphere. An induction coil 34 or any other type of induction heater can be used to heat the joining surfaces 30, 32. In the exemplary embodiment, the heating step includes heating the piston parts 26, 28 to their forging temperature, which is typically a temperature of 822° C. to 1,204° C. and at a frequency ranging from 15 to 40 kHz. The heating step typically lasts not longer than 10 seconds, and then the induction coil 34 is removed from between the joining surfaces 30, 32. In addition to heating the upper and lower joining surfaces 30, 32, the heating step includes heating a portion of the upper and lower piston parts 26, 28 located a distance from the joining surfaces 30, 32 to form a heat affected zone in each piston part 26, 28. The heat affected zone typically has a total length of 8 to 12 micrometers, and a length of 4 to 6 micrometers in each piston part 26, 28. The volume of at least one of the piston parts 26, 28, and typically both piston parts 26, 28, increases from a starting volume to a final volume due to the induction heating.

Figure 4:
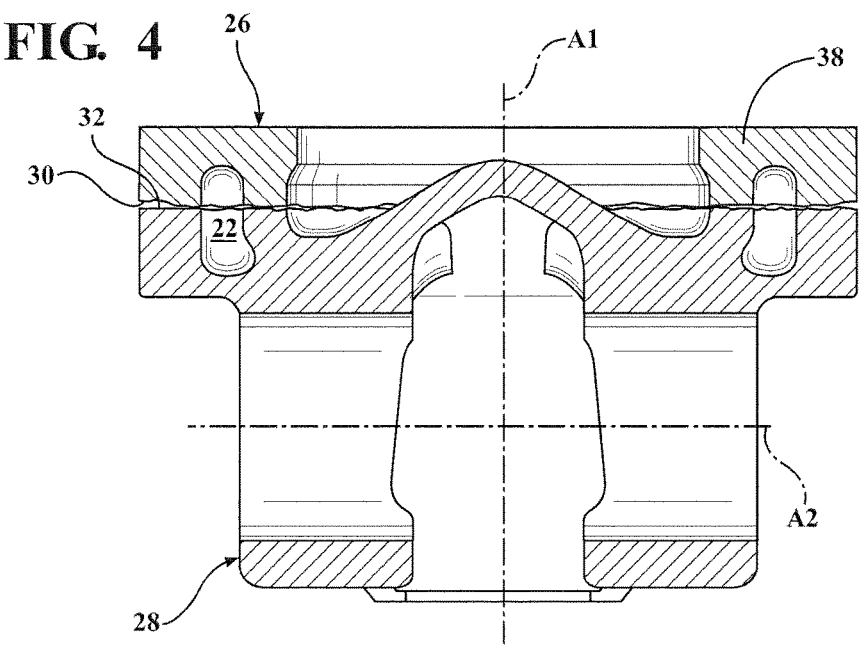
FIG. 4 illustrates another step of the method of manufacturing the piston according to the exemplary embodiment, after the volume of the upper piston part and lower piston part increases due to the induction heating and while the piston parts are still at the part growth compensated position, but before rotating and applying pressure to the piston parts.

After induction heating the piston parts, 26, 28, the method next includes bringing the heated joining surfaces 30, 32 toward one another and allowing the heated joining surfaces 30, 32 to contact one another. The joining surfaces 30, 32 are maintained in a fixed position about a center axis A1 while bringing the heated joining surfaces 30, 32 toward one another, i.e. the piston parts 26, 28 do not rotate during this step. The upper and lower piston parts 26, 28 are moved axially to a predetermined position, referred to as a part growth compensated position, which accounts for the increase in volume of the piston parts 26, 28 due to the induction heating. In the exemplary embodiment, the method includes bringing the heated joining surfaces 30, 32 to the part growth compensated position before the volume of the piston parts 26, 28 reaches the final volume. Thus, when the piston parts 26, 28 first arrive at the part growth compensated position, there is a space provided between the joining surfaces 30, 32 of the piston parts 26, 28, as shown in FIG. 3, which compensates for the increase in volume that occurs before and after the piston parts 26, 28 arrive at the part growth compensated position due to the induction heating. In the exemplary embodiment, after the piston parts 26, 28 increase in volume, but while the piston parts 26, 28 remain disposed at the part growth compensated position, the joining surfaces 30, 32 of the piston parts 26, 28 are no longer planar, and only a portion of the upper joining surface 30 of the upper piston part 26 contacts the lower joining surface 32 of the lower piston part 28, as shown in FIG. 4.

The part growth compensated position depends on the materials and geometry of the piston parts 26, 28, the heating time and temperatures, and possibly other factors. Various different methods can be used to determine the part growth compensated position. In the exemplary embodiment, the part growth compensated position is obtained by the following steps: (a) providing a test upper piston part formed of substantially the same material and having substantially the same geometry as the upper piston part 26 including the upper joining surface 30; (b) providing a test lower piston part formed of substantially the same material and having substantially the same geometry as the lower piston part 28 including the lower joining surface 32; (c) heating the test upper joining surface of the test upper piston part and the test lower joining surface of the test lower piston part by induction, wherein the volume of at least one of the test upper piston part and the test lower piston part increases from a starting volume to a final volume due to the induction heating; (d) bringing the test heated joining surfaces toward one another to an estimated part growth compensated position at a constant velocity before the at least one test piston part reaches the final volume, the step of bringing the heated joining surfaces to the estimated part growth compensated position including allowing the heated joining surfaces to contact one another; (e) monitoring an actual pressure level on the test parts for a spike in the actual pressure level; (f) adjusting the estimated part growth compensated position based on the magnitude of an identified pressure spike and position of the test parts when the pressure spike occurs; and (g) repeating steps (a)-(f) until a pressure spike of less than a predetermine value is identified during step (e). When the actual pressure level spikes, at least one of the joining surfaces of the test piston parts is upset into the other test piston part. Typically, the joining surfaces of each of the test piston parts are upset into the other test piston part. The step of adjusting the part growth compensated position then includes increasing the space between the joining surfaces when the test parts are at the estimated part growth compensated position by a distance proportional to the length of the upset formed when the actual pressure spikes.

Figure 5A:
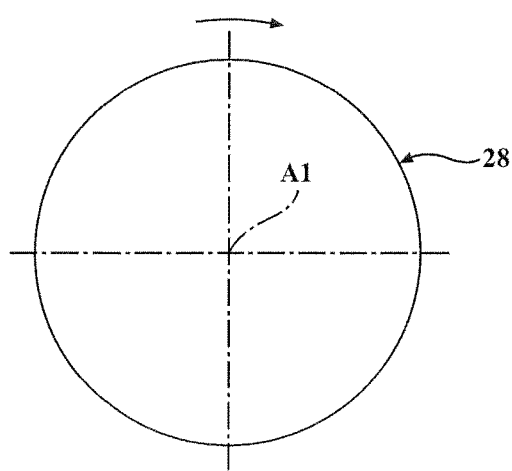
FIG. 5A is a top view of the lower piston part during a step of the method which includes rotating the lower piston part in a first direction.
Figure 5B:
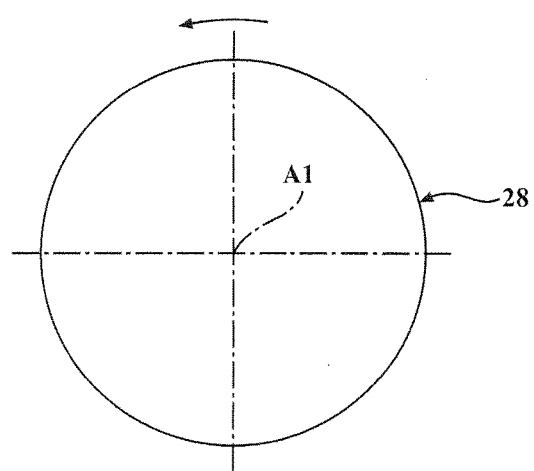
FIG. 5B is a top view of the upper piston part during a step of the method which includes rotating the lower piston part in a second direction opposite the first direction.

Once the piston parts 26, 28 are disposed at the part growth compensated position, the method includes two short rotational movements of one of the piston parts 26, 28 under a controlled pressure, to form the exceptionally strong weld 24 between the upper and lower piston parts 26, 28, and the homogenous metallurgical bond across the weld 24. This step includes rotating the one piston part 26 or 28, typically the lower piston part 28, not more than 360 degrees about the center axis A1 in a first direction, as shown in FIG. 5A, and then rotating the same piston part 26 or 28 not more than 360 degrees about the center axis A1 in a second direction opposite the first direction, as shown in FIG. 5B, while the heated joining surfaces 30, 32 contact one another. Typically, the rotating steps include rotating the one piston part 26 or 28 in an amount of 17 to 34 degrees in the first direction, and then rotating the one piston part 26 or 28 in an amount of 17 to 34 degrees in the second direction. The rotating steps also typically include rotating the one piston part 26 to the same degree of rotation in the first direction as the second direction. In the exemplary embodiment, the rotating steps include rotating the one piston part 26 in an amount of 25 degrees in the first direction, and rotating the one piston part 26 in an amount of 25 degrees in the second direction.

The method further includes applying the controlled pressure to at least one of the piston parts 26, 28 during the rotating steps to form the weld 24 between the upper piston part 26 and the lower piston part 28. When the pressure is applied, only a minimal upset of one or both of the piston parts 26, 28 occurs. For example, one of the joining surfaces 30, 32 may be upset a longitudinal distance of 0.1 to 0.6 millimeters relative to the position of the joining surface 30, 32 at initial contact with the other joining surface 30, 32.

The method further includes gradually increasing the pressure to a maximum pressure level during the rotating steps. This includes applying the pressure at a level less than the maximum pressure level throughout the step of rotating the one piston part 26 or 28 in the first direction; and obtaining and applying the maximum pressure level only during the step of rotating the one piston part 26 or 28 in the second direction. In the exemplary embodiment, the step of applying the pressure includes obtaining and applying the maximum pressure level only after the rotating steps are ⅝ complete and before the rotating steps are ⅞ complete.

The maximum pressure level to be applied to the piston parts 26, 28 can be determined based on a variety of different factors. For example, the maximum pressure level can be based on an outer diameter D1 of the upper piston part 26 at the upper joining surface 30; an outer diameter D2 of the lower piston part 28 at the lower joining surface 32; an area presented by the upper joining surface 30; an area presented by the lower joining surface 32; and a desired upset of at least one of the joining surfaces 30, 32 after the maximum pressure level is applied. In the exemplary embodiment, when the outer diameter D1 of the upper piston part 26 at the upper joining surface 30 and the outer diameter D2 of the lower piston part 28 at the lower joining surface 32 ranges from 60 mm to 200 mm, the area presented by each joining surface 30, 32 ranges from 2500 mm$^2$ to 10,000 mm$^2$, and the desired upset of one of the joining surfaces 30, 32 after the maximum pressure level is applied is not greater than 0.5 mm, then the maximum pressure level applied is typically about 23 N/mm$^2$.

Figure 6:
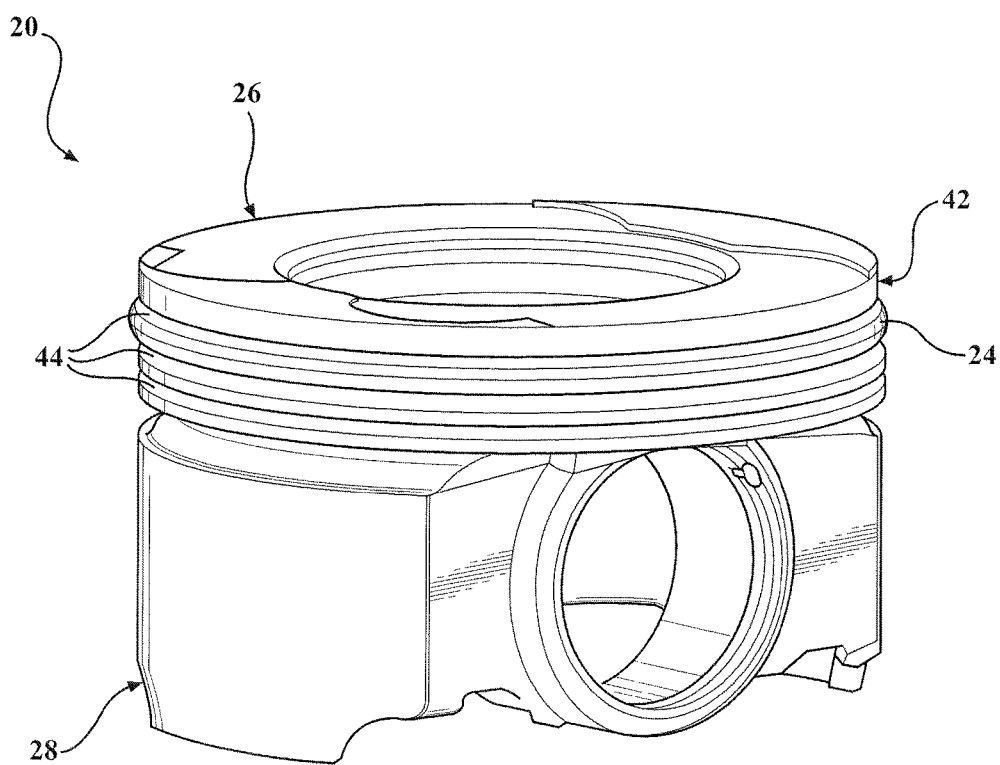
FIG. 6 is a perspective view of a hybrid induction welded piston according to another exemplary embodiment which includes a spherical radius along the weld prior to machining.

The steps of applying the pressure and rotating the piston part 26 or 28 include welding all areas of the joining surfaces 30, 32 which are in contact with one another to form the exceptionally strong and homogeneous metallurgical bond across the welded joining surfaces 30, 32, as shown in FIGS. 1 and 6. In addition, by controlling the pressure, as well as the position and degree of rotation of the one piston part 26 or 28 relative to the other, minimal or no flash forms along the weld 24 between the piston parts 26, 28. In a typical friction welding process, flash and an indentation forms along the weld between the piston parts. However, in the method of the present invention, no indentation forms along the weld 24 during the steps of bringing the joining surfaces 30, 32 together, rotating the one piston part 26 or 28, and applying the pressure. An indentation is typically present along the circumference of a weld of a piston formed by conventional friction welding. The indentation is present on both the exposed outer diameter surface and also on the internal gallery surface. The indentation on the outer diameter surface can be removed by finish machining, but the indentation on the internal gallery surface cannot be machined. This indentation along the internal gallery surface acts as a stress riser, which typically leads to the initiation of cracks. Thus, the hybrid induction welded piston 20 of the present invention, which is free of an indentation on both the outer surface 42 and the internal surface presenting the cooling chamber 22, provides the advantage of reduced cracking and thus longer service life compared to pistons formed by conventional friction welding.

In addition, another advantage is that no material is removed from the joining surfaces 30, 32 of the piston parts 26, 28 during the steps of allowing the heated joining surfaces 30, 32 to contact one another, rotating the one piston part 26 or 28, and applying the pressure. After the rotating steps, the method typically includes maintaining the upper piston part 26 and the lower piston part 28 in a fixed position about the center axis A1 while still applying the pressure for 5 seconds to 15 seconds to further promote the strength of the weld 24.

Yet another advantage provided by the hybrid induction welding process of the present invention is accurate radial positioning of the upper piston part 26 relative to the lower piston part 28. The radial positions of the piston parts 26, 28 at the end of the hybrid induction welding process are equal to, or approximately equal to, the predetermined, desired radial positions of the piston parts 26, 28 set at the start of the process. Preferably, the radial position of the upper piston part 26 relative to the lower piston part 28 at the end of the process is not more than +/−2 degrees different from the radial position of the upper piston part 26 relative to the lower piston part 28 at the start of the process. In other words, the radial position of the upper piston part 26 relative to the lower piston part 28 after applying the pressure is not more than +/−2 degrees different from the radial position of the upper piston part 26 relative to the lower piston part 28 before heating the piston parts 26, 28.

Thus, the hybrid induction welding process of the present invention is especially beneficial when the upper piston part 26 has a pre-forged geometry, such as when the upper piston part 26 includes a crown feature which is preferably disposed at a predetermined radial position relative to a pin bore axis A2 of the lower piston part 28. For example, the upper piston part 26 may have a crown feature that is preferably disposed 10 to 20 degrees +/−2 degrees from the pin bore axis A2. The desired radial position of the crown feature is set at the start of the process, and at the end of the process, the radial position of the crown feature is within +/−2 degrees of that desired radial position. One of ordinary skill in the art will understand that the radial position of the pin bore axis A2 is determined by a line extending along the pin bore axis A2 and through the center axis A1 of the piston 20; and the radial position of the crown feature is determined by a line extending through the crown feature and through the center axis A1 of the piston 20. The difference between two radial positions is determined by the angle between those two lines.

Another aspect of the invention provides the hybrid induction welded piston 20, as shown in FIGS. 1, 1A, and 6, which is produced by the method described above. The piston parts 26, 28 can comprise various different geometries. However, in the exemplary embodiment, the upper piston part 26 extends annularly around the center axis A1 and longitudinally along the center axis A1 from an upper wall 38 to a first portion of the upper joining surface 30, referred to as a first upper joining surface, and a second portion of the upper joining surface 30, referred to as a second upper joining surface. The upper piston part 26 is typically formed of a steel material, but can be another type of metal material. The upper wall 38 of the upper piston part 26 typically presents a bowl rim extending annularly around the center axis A1 and a combustion bowl 52 extending inwardly and downwardly from the bowl rim toward the center axis A1. The upper wall 38 also presents an apex at the center axis A1 surrounded by the combustion bowl 52.

As best shown in FIG. 2, the upper piston part 26 includes an upper outer rib 40 depending from the bowl rim of the upper wall 38 and extending annularly around the center axis A1 and longitudinally along the center axis A1 to the first portion of the upper joining surface 30. The upper outer rib 40 presents a first portion of an outer surface 42 of the piston 20, which extends annularly around the center axis A1 and faces away from the center axis A1. The upper outer rib 40 has a thickness t extending from the outer surface 42 to the cooling chamber 22, and the thickness t of the upper outer rib 40 can be made smaller compared to ribs of pistons formed using other welding methods. The annular outer surface 42 of the upper outer rib 40 includes at least one ring groove 44 for retaining at least one piston ring (not shown). In the exemplary embodiment, the upper piston part 26 also includes an upper inner rib 36 spaced radially inwardly from the upper outer rib 40. The upper inner rib 36 depends from the upper wall 38 beneath the combustion bowl 52 and extends annularly around the center axis A1 and longitudinally along the center axis A1 to the second portion of the upper joining surface 30. The first and second upper joining surfaces 30 are flat and extend perpendicular to the center axis A1.

The lower piston part 28 also extends annularly around the center axis A1 and longitudinally along the center axis A1 from a base wall 46 surrounding the center axis A1 to a first portion of the lower joining surface 32, referred to as a first lower joining surface, and from the base wall 46 to a second portion of the lower joining surface 32, referred to as a second lower joining surface. The first portion of the lower joining surface 32 is welded to the first portion of the upper joining surface 30, and the second portion of the lower joining surface 32 is welded to the second portion of the upper joining surface 30.

The lower piston part 28 is also formed of a metal material, which is also typically a steel material. However, the hybrid induction welding process provides for the joining of different alloys, in which case the lower piston part 28 is typically formed of a steel material having a hardness less than the hardness of the steel material of the upper piston part 26. For example, a very hard and temperature resistant alloy can be used to form the upper piston part 26 where combustion occurs, while a tougher, less costly alloy can be used to form the lower piston part 28 where cylindrical loading is present.

In the exemplary embodiment, the lower piston part 28 includes a lower outer rib 48 extending upwardly from the base wall 46 toward the upper piston part 26 and extending annularly around the center axis A1 and longitudinally along the center axis A1 to the first portion of the lower joining surface 32. The lower outer rib 48 presents a second portion of the outer surface 42 of the piston 20, which extends annularly around the center axis A1 and faces away from the center axis A1. The lower outer rib 48 also has a thickness t extending from the outer surface 42 to the cooling chamber 22, and the thickness t of the lower outer rib 48 can be made smaller compared to ribs of pistons formed using other welding methods. The annular outer surface 42 of the lower outer rib 48 includes at least one ring groove 44 for retaining at least one piston ring (not shown). The lower piston part 28 also includes a lower inner rib 50 spaced radially inwardly from the lower outer rib 48. The lower inner rib 50 extends upwardly from the base wall 46 toward the upper piston part 26, annularly around the center axis A1, and longitudinally along the center axis A1 to the second portion of the lower joining surface 32. Like the first and second portions of the upper joining surfaces 30, the first and second portions of the lower joining surfaces 32 are flat and perpendicular to the center axis A1.

The first portion of the lower joining surface 32 is radially aligned with the first portion of the upper joining surface 30, and the second portion of the lower joining surface 32 is radially aligned with the second portion of the upper joining surface 30. Each of the joining surfaces 30, 32 are symmetric relative to the center axis A1 and concentric about the center axis A1. In addition, the joining surface 30, 32 of at least one of the piston parts 26, 28 may be upset a longitudinal distance of 0.1 to 0.6 millimeters.

The welded inner ribs 36, 50 and the welded outer ribs 40, 48 and the upper wall 38 and the base wall 46 form the cooling chamber 22 therebetween. The joining surfaces 30, 32 of the outer ribs 40, 48 are welded continuously from the outer surface 42 of the piston to the cooling chamber 22, and the homogenous metallurgical bond extends across the welded ribs 36, 40, 48, 50. The cooling chamber 22 is closed and extends annularly around the center axis A1. The closed cooling chamber 22 presents a width w extending from the inner ribs 36, 50 to the outer ribs 40, 48 at the weld 24 and a volume which is free of flash or scrap metal material removed from the welded piston parts 26, 28 during the welding process. This is an advantage over friction welded pistons which typically contain scrap metal material in the cooling chamber due to the welding process. Since the piston 20 of the present invention includes no flash or scrap metal material in the cooling chamber 22, the volume of the cooling chamber 22 can be smaller than cooling chambers of other types of welded pistons. For example, the width w of the cooling chamber 22 is typically from 5% to 10% of the outer diameter D1, D2 of the piston parts 26, 28 at the weld 24. The thickness t of the outer ribs 40, 48 can also be made smaller compared to pistons formed using other welding methods. In addition, minimal residual stress is formed in the piston, thus eliminating the concern for cracking of the piston parts 26, 28 after welding, which oftentimes occurs in friction welded pistons.

As shown in FIG. 1A, the inner ribs 36, 50 of the hybrid induction welded piston 20 surround the center axis A1 and form a combustion bowl 52. The joining surfaces 30, 32 of the inner ribs 36, 50 are welded continuously from the cooling chamber 22 to the combustion bowl 52, and the homogenous metallurgical bond extends across the welded inner ribs 36, 50.

A portion of each of the upper ribs 36, 40 and a portion of each of the lower ribs 48, 50 located along the weld 24 include the heat affected zone. In the exemplary embodiment, when both the upper and lower piston parts 26, 28 are formed of steel material, the steel material of the heat affected zone includes a microstructure of tempered martensite. The steel material surrounding the heat affected zone has a microstructure different from the tempered martensite of the heat affected zone. In the exemplary embodiment, the martensitic material of the heat affected zone is harder than the surrounding material.

As shown in FIG. 1A, the heat affected zone has a length HAZ extending along and parallel to the center axis A1. In the exemplary embodiment, the heat affected zone length HAZ is 8 to 12 micrometers. The piston 20 presents also presents a total cross-sectional area at the weld 24, which includes the area of the joining surfaces 30, 32, the area of the combustion bowl 52, and the area of the cooling chamber 22. The joining surfaces 30, 32 of the piston 20 at the weld 24 together present a cross-sectional area of 35% to 60% of the total cross-sectional area of the piston 20.

As discussed above, immediately upon completion of the welding process, the outer surface 42 along the weld 24 and along the heat affected zone are free of any type of visible weld parting line or indentation. The outer surface 42 of the portions along the weld 24 and including the heat affected zone are also free of flash, prior to any machining, which is an advantage over other types of welded pistons. In the exemplary embodiment of FIG. 1, the outer surface 42 of the piston 20 presents a flat surface along the heat affected zone and the weld 24. In this case, the flat outer surface 42 extends continuously around the center axis A1 along the weld 24 and longitudinally along the heat affected zone.

The desired flat outer surface 42 is preferably formed during the hybrid induction welding process. However, the outer surface 42 of the piston 20 typically presents a convex surface having a spherical radius of at least 1.63 millimeters along the heat affected zone and the weld 24, as shown in FIG. 6, at the end of the welding process and prior to any machining. In this case, the outer surface 42 located along the heat affected zone and the weld 24 is convex and presents a bulge extending radially outwardly and continuously around the center axis A1. The outer diameter D1, D2 of the piston 20 at the bulge is 2 to 5 millimeters greater than the outer diameter D1, D2 of the piston 20 adjacent the bulge. Typically, any spherical radius or convex surface formed along the weld 24 and present at the end of the welding process is machined to provide the desired flat outer surface 42 shown in FIG. 1.

In the exemplary embodiment, the lower piston part 28 includes a pair of pin bosses 54 extending downwardly from the base wall 46 away from the upper piston part 26. Each pin boss 54 presents a pin bore 56, and the pin bores 56 are aligned with one another along a second axis A2 perpendicular to the center axis A1. The lower piston part 28 includes a pair of skirt sections 58 each depending from the base wall 46 and spaced from one another by one of the pin bosses 54.

Obviously, many modifications and variations of the present invention are possible in light of the above teachings and may be practiced otherwise than as specifically described while within the scope of the appended claims.

What is claimed is:

1. A method of manufacturing a piston, comprising the steps of:
    heating an upper joining surface of an upper piston part and a lower joining surface of a lower piston part by induction;
    bringing the heated joining surfaces toward one another and allowing the heated joining surfaces to contact one another;
    rotating one of the piston parts not more than 360 degrees in a first direction while the heated joining surfaces contact one another;
    rotating the one piston part not more than 360 degrees in a second direction opposite the first direction while the heated joining surfaces contact one another;
    applying pressure to at least one of the piston parts during the rotating steps to form a weld between the upper piston part and the lower piston part; and
    the step of applying the pressure including increasing the pressure to a maximum pressure level and applying the maximum pressure level while rotating the one piston part in the second direction.

2. The method of claim 1 including applying the pressure at a level less than the maximum pressure level throughout the step of rotating the one piston part in the first direction; and obtaining and applying the maximum pressure level only during the step of rotating the one piston part in the second direction.

3. The method of claim 1, wherein no indentation forms along an outer surface of the upper piston part and the lower piston part at the weld during the steps of bringing the joining surfaces together, rotating the one piston part, and applying the pressure.

4. The method of claim 1, wherein no material is removed from the joining surfaces of the piston parts during the steps of allowing the heated joining surfaces to contact one another, rotating the piston parts, and applying the pressure.

5. The method of claim 1, wherein the step of applying the pressure includes upsetting one of the joining surfaces a longitudinal distance of 0.1 to 0.6 millimeters relative to the position of the joining surface at initial contact with one another.

6. The method of claim 1, wherein the step of applying the pressure includes gradually increasing the pressure to the maximum pressure level during the rotating steps.

7. The method of claim 6, wherein the step of applying the pressure includes obtaining and applying the maximum pressure level only after the rotating steps are ⅝ complete and before the rotating steps are ⅞ complete.

8. The method of claim 1 including determining the maximum pressure level to be applied to the at least one of the upper piston part and the lower piston part based on at least one of an outer diameter of the upper piston part at the upper joining surface; an outer diameter of the lower piston part at the lower joining surface; an area presented by the upper joining surface; an area presented by the lower joining surface; and a desired upset of at least one of the joining surfaces after the maximum pressure level is applied.

9. The method of claim 1, wherein the maximum pressure level is 23 N/mm$^2$.

10. The method of claim 1, wherein the rotating steps include rotating the one piston part to 17-34 degrees in the first direction; and rotating the one piston part to 17-34 degrees in the second direction.

11. The method of claim 10, wherein the rotating steps include rotating the one piston part 25 degrees in the first direction; and rotating the one piston part 25 degrees in the second direction.

12. The method of claim 1, wherein the rotating steps include rotating the one piston part to the same degree of rotation in the first direction and the second direction.

13. The method of claim 1, wherein the volume of at least one of the piston parts increases from a starting volume to a final volume due to the induction heating; and the step of bringing the heated joining surfaces toward one another includes bringing the heated joining surfaces to a part growth compensated position before the volume of the at least one piston part reaches the final volume, wherein the part growth compensated position provides a space between the joining surfaces which compensates for the increase in volume.

14. The method of claim 13 including obtaining the part growth compensated position by:
    (a) providing a test upper piston part formed of substantially the same material and having substantially the same geometry as the upper piston part including the upper joining surface;
    (b) providing a test lower piston part formed of substantially the same material and having substantially the same geometry as the lower piston part including the lower joining surface;
    (c) heating a test upper joining surface of the test upper piston part and a test lower joining surface of the test lower piston part by induction, wherein the volume of at least one of the test upper piston part and the test lower piston part increases from a starting volume to a final volume due to the induction heating;
    (d) bringing the test heated joining surfaces toward one another to an estimated part growth compensated position at a constant velocity before the at least one test piston part reaches the final volume, the step of bringing the heated joining surfaces to the estimated part growth compensated position including allowing the heated joining surfaces to contact one another;
    (e) monitoring an actual pressure level on the test parts for a spike in the actual pressure level;
    (f) adjusting the estimated part growth compensated position based on the magnitude of an identified pressure spike and position of the test parts when the pressure spike occurs; and
    (g) repeating steps (a)-(f) until a pressure spike of less than a predetermine value is identified during step (e).

15. The method of claim 14 including upsetting at least one of the joining surfaces of the test piston parts when the actual pressure level spikes; and wherein the step of adjusting the part growth compensated position includes increasing the space between the joining surfaces when the test parts are at the estimated part growth compensated position by a distance proportional to the length of the upset formed when the actual pressure spikes.

16. The method of claim 13, wherein the step of bringing the heated joining surfaces to the part growth compensated position includes moving at least one of the upper piston part and the lower piston part axially toward the other part, and wherein only a portion of the upper joining surface contacts the lower joining surface when the piston parts are disposed at the part growth compensated position.

17. The method of claim 1 including maintaining the joining surfaces in a fixed position about a center axis while bringing the heated joining surfaces toward one another.

18. The method of claim 1, wherein the heating step includes heating the piston parts to a temperature of 822° C. to 1,204° C. for not longer than 10 seconds and providing a heat affected zone along the weld, wherein the heat affected zone has a length of 8 to 12 micrometers.

19. The method of claim 1 including maintaining the upper piston part and the lower piston part in a fixed position about a center axis while applying pressure for 5 seconds to 15 seconds after the rotating steps.

20. The method of claim 1, wherein the steps of applying the pressure and rotating the piston parts include welding all areas of the joining surfaces in contact with one another.

21. The method of claim 1, wherein the radial position of the upper piston part relative to the lower piston part after applying the pressure is not more than +/−2 degrees different from the radial position of the upper piston part relative to the lower piston part before heating the piston parts.

22. A method of manufacturing a piston, comprising the steps of:
heating an upper joining surface of an upper piston part and a lower joining surface of a lower piston part by induction, wherein the volume of at least one of the piston parts increases from a starting volume to a final volume due to the induction heating;
bringing the heated joining surfaces toward one another and allowing the heated joining surfaces to contact one another;
rotating one of the piston parts not more than 360 degrees in a first direction while the heated joining surfaces contact one another;
rotating the one piston part not more than 360 degrees in a second direction opposite the first direction while the heated joining surfaces contact one another;
applying pressure to at least one of the piston parts during the rotating steps to form a weld between the upper piston part and the lower piston part; and
the step of bringing the heated joining surfaces toward one another includes bringing the heated joining surfaces to a part growth compensated position before the volume of the at least one piston part reaches the final volume, wherein the part growth compensated position provides a space between the joining surfaces which compensates for the increase in volume.

23. The method of claim 22, wherein the step of applying the pressure includes increasing the pressure to a maximum pressure level and applying the maximum pressure level while rotating the one piston part in the second direction.

24. The method of claim 23 including applying an intermediate pressure level of 40% to 60% of the maximum pressure when the joining surfaces contact one another before the rotating steps.

25. A method of manufacturing a piston, comprising the steps of:
heating an upper joining surface of an upper piston part and a lower joining surface of a lower piston part by induction;
bringing the heated joining surfaces toward one another and allowing the heated joining surfaces to contact one another;
rotating at least one of the piston parts in a first direction while the heated joining surfaces contact one another;
applying pressure to at least one of the piston parts during the rotating steps to form a weld between the upper piston part and the lower piston part; and
the step of applying the pressure including increasing the pressure to a maximum pressure level and applying the maximum pressure level while rotating the one piston part in a second direction opposite the first direction.

26. A method of manufacturing a piston, comprising the steps of:
heating an upper joining surface of an upper piston part and a lower joining surface of a lower piston part by induction;
bringing the heated joining surfaces toward one another and allowing the heated joining surfaces to contact one another;
rotating at least one of the piston parts while the heated joining surfaces contact one another;
applying pressure to at least one of the piston parts during the rotating steps to form a weld between the upper piston part and the lower piston part;
wherein the volume of at least one of the piston parts increases from a starting volume to a final volume due to the induction heating;
the step of bringing the heated joining surfaces toward one another includes bringing the heated joining surfaces to a part growth compensated position before the volume of the at least one piston part reaches the final volume; and
wherein the part growth compensated position provides a space between the joining surfaces which compensates for the increase in volume.

27. A piston, comprising:
an upper piston part including an upper joining surface;
a lower piston part including a lower joining surface welded to said upper joining surface;
a portion of said upper piston part and a portion of said lower piston part located along said weld together presenting an outer surface; and
said outer surface of said portions located along said weld being free of an indentation prior to machining said outer surface and wherein said weld has been twisted in opposite first and second directions to achieve said indentation-free surface.

28. The piston of claim 27, wherein said portions of said upper piston part and said lower piston part located along and adjacent said weld include a heat affected zone having a length of 8 to 12 micrometers.

29. The piston of claim 28, wherein said heat affected zone includes a microstructure of tempered martensite; and said upper piston part and said lower piston part surrounding said heat affected zone have a microstructure different from said tempered martensite and a hardness less than the hardness of said heat affected zone.

30. The piston of claim 28, wherein said outer surface is flat along said heat affected zone.

31. The piston of claim 30, wherein said flat outer surface extends continuously around said center axis along said weld and longitudinally along said heat affected zone.

32. The piston of claim 27, wherein said outer surface located along said weld presents a bulge extending radially outwardly and continuously around said center axis, and an outer diameter of said piston at said bulge is 2 to 5 millimeters greater than an outer diameter of said piston adjacent said bulge.

33. The piston of claim 27, wherein said outer surface located along said weld is a convex surface extending radially outwardly, and said convex surface presents a spherical radius of at least 1.63 millimeters prior to machining.

34. The piston of claim 27, wherein said upper piston part is welded to said lower piston part continuously along all areas of said joining surfaces in contact with one another.

35. The piston of claim 27, wherein said outer surface presents an outer diameter at said weld,
 said upper piston part includes an upper outer rib extending annularly around a center axis and longitudinally along said center axis to said upper joining surface;
 said upper piston part includes an upper inner rib spaced radially inwardly from said upper outer rib and extending annularly around said center axis and longitudinally along said center axis to said upper joining surface;
 said lower piston part includes a lower outer rib extending annularly around said center axis and longitudinally along said center axis to said lower joining surface, said lower joining surface of said lower outer rib is radially aligned with said upper joining surface of said upper outer rib;
 said lower piston part includes a lower inner rib spaced radially inwardly from said lower outer rib and extending annularly around said center axis and longitudinally along said center axis to said lower joining surface, said lower joining surface of said lower inner rib is radially aligned with said upper joining surface of said upper inner rib;
 an upper wall extends between an end of said upper outer rib and an end of said upper inner rib opposite said upper joining surface;
 a base wall extends between an end of said lower outer rib and an end of said lower inner rib opposite said lower joining surface;
 said inner ribs and said outer ribs and said upper wall and said base wall form a cooling chamber therebetween;
 said cooling chamber has a cooling chamber width extending from said inner ribs to said outer ribs at said weld; and
 said cooling chamber width is from 5% to 10% of said outer diameter at said weld.

36. The piston of claim 27, wherein said upper piston part is formed of a metal material and extends annularly around a center axis and longitudinally along said center axis from an upper wall to a first upper joining surface and a second upper joining surface;
 said metal material of said upper piston part is a steel material;
 said upper wall of said upper piston part presents a bowl rim extending annularly around said center axis and a combustion bowl extending inwardly and downwardly from said bowl rim toward said center axis;
 said upper wall presents an apex at said center axis surrounded by said combustion bowl;
 said upper piston part includes an upper outer rib depending from said bowl rim of said upper wall and extending annularly around said center axis and longitudinally along said center axis to said first upper joining surface;
 said upper outer rib presents a first portion of said outer surface, said outer surface extends annularly around said center axis and faces away from said center axis;
 said annular outer surface of said upper outer rib includes at least one ring groove for retaining at least one piston ring;
 said upper piston part includes an upper inner rib spaced radially inwardly from said upper outer rib;
 said upper inner rib depends from said upper wall beneath said combustion bowl and extends annularly around said center axis and longitudinally along said center axis to said second upper joining surface;
 said first and second upper joining surfaces are flat and extend perpendicular to said center axis;
 said lower piston part is formed of a metal material and extends annularly around said center axis and longitudinally along said center axis from a base wall surrounding said center axis to a first lower joining surface welded to said first upper joining surface and from said base wall to a second lower joining surface welded to said second upper joining surface;
 said metal material of said lower piston part is a steel material having a hardness less than the hardness of the steel material of said upper piston part;
 said lower piston part includes a lower outer rib extending upwardly from said base wall toward said upper piston part and extending annularly around said center axis and longitudinally along said center axis to said first lower joining surface;
 said lower outer rib presents a second portion of said outer surface extending annularly around said center axis and facing away from said center axis;
 said annular outer surface of said lower outer rib includes at least one ring groove for retaining at least one piston ring;
 said lower piston part includes a lower inner rib spaced radially inwardly from said lower outer rib;
 said lower inner rib extends upwardly from said base wall toward said upper piston part and extends annularly around said center axis and longitudinally along said center axis to said second lower joining surface;
 said first and second lower joining surfaces are flat and perpendicular to said center axis;
 said first lower joining surface is radially aligned with said first upper joining surface and said second lower joining surface is radially aligned with said second upper joining surface;
 each of said joining surfaces are symmetric relative to said center axis and concentric about said center axis;
 said joining surface of at least one of said piston parts is upset a longitudinal distance of 0.1 to 0.6 millimeters;
 said welded inner ribs and said welded outer ribs and said upper wall and said base wall form a cooling chamber therebetween;
 said joining surfaces of said outer ribs are welded continuously from said outer surface to said cooling chamber;
 said cooling chamber is closed and extends annularly around said center axis;
 said closed cooling chamber presents a volume which is free of metal material removed from said welded piston parts;
 said cooling chamber has a cooling chamber width extending from said inner ribs to said outer ribs at said weld;
 said cooling chamber width is from 5% to 10% of an outer diameter of said piston parts at said weld;
 said inner ribs surround said center axis and form a combustion bowl;

said joining surfaces of said inner ribs are welded continuously from said cooling chamber to said combustion bowl;
a portion of each of said upper ribs and a portion of each of said lower ribs extending annularly around said center axis along said weld include a heat affected zone;
said metal material of said heat affected zone includes a microstructure of tempered martensite;
said metal material of said upper piston part and said lower piston part surrounding said heat affected zone have a microstructure different from said tempered martensite of said heat affected zone and have a hardness less than the hardness of said heat affected zone;
said outer surface of said portions along said weld and including said heat affected zone are free of a visible weld parting line;
said outer surface of said portions along said weld and including said heat affected zone are free of flash;
said outer surface along said weld presents a flat surface or convex surface having a spherical radius of at least 1.63 millimeters prior to machining;
said lower piston part includes a pair of pin bosses extending downwardly from said base wall away from said upper piston part;
each of said pin bosses presents a pin bore;
said pin bores are aligned with one another along a second axis perpendicular to said center axis;
said lower piston part includes a pair of skirt sections each depending from said base wall and spaced from one another by one of said pin bosses;
said piston has a total piston length extending along and parallel to said center axis from an uppermost end of said upper wall to a lowermost end of said pin bosses or skirt sections;
said heat affected zone has a HAZ length extending along and parallel to said center axis, said HAZ length is 8 to 12 micrometers;
said piston presents a total cross-sectional area at said weld, said total cross-sectional area includes the area of said joining surfaces, the area of said combustion bowl, and the area of said cooling chamber;
said joining surfaces of said piston at said weld together present a total weld cross-sectional area of 35% to 60% of said total cross-sectional area.

* * * * *